(12) United States Patent
Yu et al.

(10) Patent No.: US 8,793,274 B2
(45) Date of Patent: Jul. 29, 2014

(54) SYSTEM AND METHOD FOR AUTO CONTENT RECOGNITION

(76) Inventors: Lei Yu, Hangzhou (CN); Yangbin Wang, Palo Alto, CA (US); Qier Lv, Hangzhou (CN)

( * ) Notice: Subject to any disclaimer, the term of this patent is extended or adjusted under 35 U.S.C. 154(b) by 94 days.

(21) Appl. No.: 13/204,845

(22) Filed: Aug. 8, 2011

(65) Prior Publication Data

US 2011/0289114 A1   Nov. 24, 2011

(51) Int. Cl.
*G06F 17/30* (2006.01)
(52) U.S. Cl.
USPC .......................................................... 707/769
(58) Field of Classification Search
CPC ................................................ G06F 17/30132
USPC ................. 707/2, 3, 769; 382/100; 704/200.1
See application file for complete search history.

(56) References Cited

U.S. PATENT DOCUMENTS

| 8,009,861 | B2 | 8/2011 | Lu et al. | |
| 8,204,314 | B2 | 6/2012 | Lu et al. | |
| 2004/0229231 | A1* | 11/2004 | Frudakis et al. | 435/6 |
| 2008/0227653 | A1* | 9/2008 | Fodor et al. | 506/9 |
| 2009/0157391 | A1* | 6/2009 | Bilobrov | 704/200.1 |
| 2011/0311095 | A1* | 12/2011 | Archer | 382/100 |

* cited by examiner

*Primary Examiner* — Etienne Leroux

(57) ABSTRACT

System and method for automatically recognizing media contents comprise steps of capturing media content from the Internet and/or devices, extracting fingerprints from captured contents and transferring to the backend servers for identification, and backend servers processing the fingerprints and replying with identified result.

20 Claims, 4 Drawing Sheets

SYSTEM AND METHOD FOR AUTO CONTENT RECOGNITION

BACKGROUND OF THE INVENTION

1. Field of the Invention

The present invention, which relates to a method and system for automatically recognizing media contents, comprises the steps of 1) capturing media contents via sensors from the Internet or offline devices such as TVs, 2) extracting VDNA (Video DNA) fingerprints from captured contents and transferring to the backend servers for identification, 3) backend servers process the VDNA fingerprints and reply with identified result. Specifically, the present invention relates to facilitating automatic recognition of media contents from both online and offline.

2. Description of the Related Art

The modern media industry continuously outputs huge amount of media contents with restricted copyrights. These contents are distributed via various transmission methods such as on broadcasting networks like TV/radio stations, on cinema, by DVD (digital video disc) copies, or through the Internet. Usually, people use metadata of the media content to identify them, such as video title, posters, casts including director, main actors and actress etc. But, using only metadata as identification means is not sufficient. There are times when people mistake different movies with same or similar titles, or they cannot remember the name of media content that they are interested in. Such problems make it difficult for studios in the media industry to distribute and promote their works.

In the earlier years, media contents were distributed through very limited ways. The most common ways were through TV (television) broadcast and via the cinema. In those times, content owners did not need to worry about illegal copies of their works. Everything they needed to do was to make people aware of their artworks. Content owners notified people or consumers about their works by postal mails or by broadcast advertisement through TV. Content owners simply benefit from selling movie tickets to audiences.

As the gradually popularity of the Internet, there are more and more ways for content owner to distribute their works, also it becomes easier for people to obtain information of their favorite media contents. But with the increasing number of distribution ways, it is more difficult for content owners to protect copyrights of their media contents. Illegal copies of media contents are easily downloaded or shared on the Internet, through UGC (user generated content) websites or P2P (point to point) networks. Content owners are having severe challenges to leverage the online propagation of their media contents against economical loss brought by pirated contents. Users, on the other hand, may not have valid and efficient means to distinguish between legal and pirated media contents.

Violation of media copyrights not only appears on the Internet, unauthorized contents are also found on the TV broadcasting network, which makes it more difficult for content owners to discover and record illegal usage of their contents. The reason lies in 1) there are huge number of TV stations broadcasting globally at the same time, 2) ways of recording and analyzing broadcasting signals are not as mature as those on the Internet. Some TV stations use illegal copies of media content to attract audience and benefit from them. TV stations using illegal contents may change some metadata of the media content so that content owner maybe confused even when they are monitoring the TV signals. But by changing the basic information of the media content such as title and director etc. will be acceptable for audiences who are actually watching the content, since that complementary information would not affect the experience of media content itself.

Companies and studios in the media industry generate revenue through the following ways:

1) By selling copies of the media contents, such as CD copies of audio, DVD copies of movie, file copies on Internet, box office from the cinemas, or even VOD (video on demand) from online or digital TV networks, etc. Content owners would publish a lot of related information including posters, short video samples for previewing, news release conference and so on. All of these are used to attract audiences and help them remember their new works.
2) By embedding advertisement inside media contents. Content owners are compensated by view or click count of advertisements.
3) By selling the copyright of their media contents to those who deals with associated commodities related to the media content. Content owners may be paid by the authorization of copies. But content owners are hardly possible to control the copyright of their artworks all over the world. There always been people who use the contents without any authorized copyright.
4) And so on . . . .

Therefore, content owners will face tremendous loss of revenue if they fail to control misuse or deliberately usage of illegal or unauthorized media contents from both online and offline.

Conventionally, most content owners employ a lot of human resources to monitor on every possible way where their media contents may be illegally copied or shared. For example they hire employees to surf on the Internet and discover illegal copies of media contents on different websites and file sharing networks such as BT and eDonkey etc., and to watch TV on different TV channels so as to monitor whether or not their media contents are illegally used. Due to the enormous size of the Internet and huge amount of TV broadcasting channels globally, it is impossible for content owners to monitor every ways of usage and sharing of their contents, also the cost would be to huge which makes it not feasible.

Content owners and other organizations have invented a lot of method to recognize the media contents automatically:

1) Keywords: The keywords specified by content owners that can be identify the media content. Not only in earlier years, but also in the recent years, it is very popular and practical for content owners to identify their media contents using keywords. For example we use word avatar, which is the title of movie <Avatar> to identify that movie, while sharing it between people all over the world.
2) File hash: The hash of the media content file. Each media content can be saved as a file, and each file can be identified by a hash. A unique file hash is generated from the content file itself. Any small change of file can make a difference on the related hash.
3) Watermark: Modify the original media content to embed extra information in the media content file, which is difficult or not possible to be removed and has very limited influence to the content. Although the influence is limited, the modification has been made and the media is changed permanently.

There are disadvantages on methods mentioned above.

As time goes on, there have been more and more media contents produced by various content owners. There are many albums or movies that have identical keywords. It is no longer convenient to identify media contents using single keyword. Although people can apply multiple keywords, the power of keywords to identify the media content is getting weaken.

File hash is very accurate and sensitive, and it is useful when identifying files with same content. But the accuracy becomes its disadvantage when identifying the files. Because it is common for people to change the size and format of media content file so that it is more suitable to play on mobile devices or transfer over networks. When the file size or format is changed, the content of file will be changed so as the file hash. Since there have been many different types of copies for same media content all over the Internet, it is impossible for content owners to provide every hash of all of their media contents.

The watermark is a better way for people to recognize the media content since it is difficult to change or remove it. But it alters the original media content and making non-reversible changes to the media content. So it is not common in the world for content owners to identify their artworks using watermarks.

As various media contents being accumulated and propagated over the Internet, conventional technologies cannot satisfy content owners' requirement to track and monitor their content owners.

The present invention enables automatic content recognition. The VDNA (Video DNA) fingerprinting technology uses the information that extracted from the media content to identify the content. It identifies media content by comparing the fingerprint data of the content with the fingerprint data in a database with media contents registered by content owners. The system and method introduced in this patent applies VDNA technology combined with other traditional recognition methods.

The VDNA (Video DNA) technology overcomes the disadvantages of the traditional methods. It does not need to change the media content like the watermark method does. It does not use hash to compare media content, so that it allows media content not exactly same as the original media content. It does not use keyword to identify the media content so that it still works with media contents with same keywords.

SUMMARY OF THE INVENTION

An object of the present invention is to overcome at least some of the drawbacks relating to the prior arts as mentioned above.

Conventional content recognition methods require additional content-related information such as title, description, actors and actresses etc. But such addition information is too simple that sometimes they will make people confused for example different media contents have a same title. However in the present invention, the auto content recognition method will not cause the mentioned confusion. Media contents are identified by the content itself. People who are interested in a movie no longer need to remember the additional information of it; instead they just capture a snapshot of the content using a mobile device. The present invention will also make it possible for content providers to substitute advertisements embedded in the content, because they are aware of the media contents.

The media content itself contains the most authentic and genuine information of the content. In the present invention presented in this patent, the media content is identified by the characteristics of media content itself. There are two base types of media representations: analog signal and digital signal. Analogy signal can be converted to digital signal, so that computer systems using special algorithms such as VDNA technology can identify media contents. The present invention presented in this patent introduced a system and method that using computers to identify media content which can be used to help people remember the basic information of media content and all other related information, as well as assist content owners to track and identify usage of their media contents both on the Internet and the TV broadcasting network.

The system and method described in the present invention presents a new experience to recognize media content using characteristics of the content. Using this method, people are no longer needed to remember the title of the media content. Computer system is used to store the metadata information of media content as well as identify the media content. ACR system users open the sensor of their devices and capture their interested contents using the device. The media content will be identified automatically using the device and the backend identification system.

Media contents have their own characteristics that can be used to identify themselves. Audio can be presented by a wave of sound, and images or video can be presented by color information. With different levels of sound in a sequence which has same time interval, different audio will presented as different shape of wave, audio content can be recognized by matching the wave shape. Video data can be treated as different level of color in sequences which have same interval of time, different video will presented as different shape of waves, video content can be recognized by matching all of the waves' shape. An object of the present invention is to automatically identify media contents using a device with sensors which can capture audio and video, such as smart phone and so on.

Front-end devices mentioned above capture video and audio from media contents using their sensors such as camera and microphone. The captured media contents will then be extracted into VDNA fingerprints, so that they are feasible to transmit over networks, and user's privacy is thus protected. The VDNA fingerprint can be treated as highly compressed media content, which cannot be restored to the original captured media content, yet they have basic information that can be identified when put together with timestamps. The VDNA fingerprint is very compact to transmit and is very rapid to be extracted from media contents, so that this process will consume only a few of device resources.

VDNA fingerprint is the essence of media content identification technology, it extracts the characteristic values of each frame of image or audio from media contents. Such process is similar to collecting and recording human fingerprints. Due to the fact that VDNA technology is entirely based on the media content itself that means in between media content and generated VDNA there is a one-to-one mapping relationship.

Compared to the conventional method of using digital watermark technology to identify video contents, VDNA technology does not require pre-processing the video content to embed watermark information. Also the VDNA extraction algorithm is greatly optimized to be efficient, fast and lightweight so that it consumes only an acceptable amount of CPU (central processing unit) or memory resources on the front-end devices. The VDNA extraction process is performed on the device side very efficiently, and the extracted fingerprints are very small in size compared to the media content, which means a lot because it makes transferring fingerprints over network possible.

The VDNA fingerprint can also be stored separately and uploaded to the identification server anytime when network transmission is available.

The VDNA fingerprints are sent to the identification server over network after extracted from front-end devices. Since VDNA fingerprints are very compact, it is feasible to transfer also over mobile networks such as 3G (third generation) or CDMA (code division multiplex division) networks, where they have lower bandwidth.

The identification server has an interface to receive VDNA fingerprint queries from front-end devices. And it is configured with a database where content owners registered media contents as master media. The master media in the database are also stored as VDNA fingerprints, and they are tagged with complete metadata information. After the incoming VDNA fingerprints are identified by comparing with the registered master media using advanced algorithms, identification server will feedback the result with extra metadata information of the recognized content.

The identification server has routines that used for identifying incoming VDNA fingerprints received from network and comparing them with VDNA fingerprints of master media that restored in the database. The form of incoming VDNA fingerprints can be a single file or fingerprints data stream. The streaming type of VDNA fingerprints can also be divided into pieces of fingerprint data with any time interval and presented as separate VDNA fingerprint data files. Those separate pieces of fingerprint data can be used to compare with the fingerprint data that stored in the master media database.

The present invention provides a system of recognizing media contents, which has the functions including capturing audio and video content, extracting into VDNA fingerprints, data transmission, identification and so on.

Content owners provide the VDNA fingerprints of their master media content together with other metadata information of the content. VDNA fingerprints are generated from the master contents that can be used to uniquely identify the content. The metadata information is stored in the database of identification server combined with the VDNA fingerprint data.

Content owners are not required to provide their original master media content. All they have to do is to submit the non-reversible VDNA fingerprints extracted from that master media content. So that it can avoid from keeping copies of media contents on the identification server. Using the present invention that presented in this patent, people can retrieve the genuine official information of the media contents that they discover at anytime when network connection to identification server is available. Content captured by front-end device can be identified by comparing extracted VDNA fingerprints with registered VDNA fingerprint data in the database. The metadata information of the media content that retrieved from the identification server is accurate and genuine because they are provided by the content owners.

If VDNA fingerprints are generated continuously on front-end device, playing timestamp will also be provided along with the fingerprints. So that media contents going to play in next seconds can be predicted by identification as soon as the current playing content is recognized. As an instance of the present invention that presented in this patent, advertisements embedded inside a video can be predicted. Content owner can change their advertisements by pushing new advertisements to the front-end devices at the predicted time. So that the original advertisements can be replaced with new ones provided by content owners or advertisement agents.

With the present invention that presented in this patent, human resources that hired by content owners to monitor and report content usage can be economized. The workload can be transfer to automatic routines of computers and networks. The front-end devices will monitor and capture the media content from the target, and extract the captured media content into VDNA fingerprint data then transmit it to the remote identification server. The identification server can be constructed centralized or as a distributed system. The system receives VDNA fingerprint data from front-end devices and compares the VDNA fingerprints with sample master fingerprint data that stored in the fingerprint database. So that the media contents playing on target sources (TV broadcasting, Internet sharing etc.) will be recognized automatically. Content owners only need to assign resources to specify target sources and media contents to monitor.

For content owners, the identification server will record the history of identification requests together with identification results. The data recorded by the identification server may also contain the location where the content is playing, the time when the content played, total amount of people who pay attention to the content and so on. Content owners can use these data to analysis the popularity of their media contents in different areas at different times.

The whole recognition process is performed automatically using the system and method presented in this patent. Users do not need to understand the steps how the identification works and where the information is generated. At the scene where users want to recognize the media content, they switch on the sensors on their front-end devices, which capture the contents that they are interested in. The dedicated routine designed for ACR system in the device will perform the steps to extract captured media contents. The device receives raw media contents from its sensors, and then processes them automatically in the background to extract VDNA fingerprint data. Then the device will send the fingerprint data to the identification server via the network that is available on the device. On the identification server, it listens on the network for the identification requests. The identification server combines the pieces of fingerprint data from the front-end device and then compare to the sample fingerprint data in the fingerprint database.

Then the identification server will response with feedback of recognition results to the front-end device. All of these steps are performed automatically, and users do not need to understand about when to perform a request and how the content is recognized. All these and other introductions of the present invention will become much clear when the drawings as well as the detailed descriptions are taken into consideration.

BRIEF DESCRIPTION OF THE DRAWINGS

For the full understanding of the nature of the present invention, reference should be made to the following detailed descriptions with the accompanying drawings in which.

Like reference numerals refer to like parts throughout the several views of the drawings.

DESCRIPTION OF THE PREFERRED EMBODIMENT

The present invention now will be described more fully hereinafter with reference to the accompanying drawings, in which some examples of the embodiments of the present inventions are shown. Indeed, these inventions may be embodied in many different forms and should not be construed as limited to the embodiments set forth herein; rather, these embodiments are provided by way of example so that this disclosure will satisfy applicable legal requirements. Like numbers refer to like elements throughout.

Figure 1:
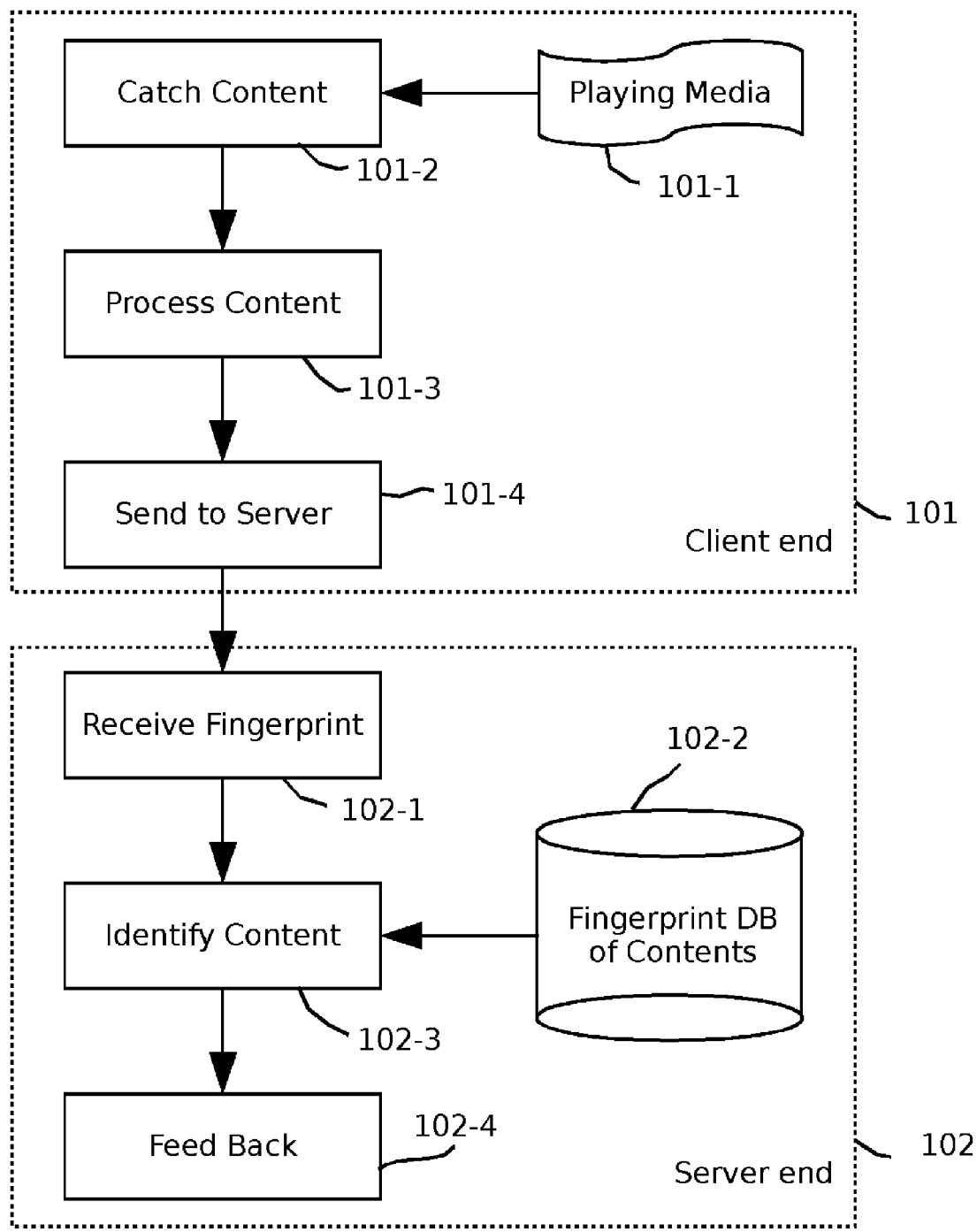
FIG. 1 is a flow chart showing a number of steps of automatic content recognition in the front-end and in the server end.

FIG. 1 illustrates the work flow of the automatic content recognition method, in which 101 represents the workflow that the front-end device performs for identifying the content including steps of capturing audio and video contents and extracting VDNA fingerprints from the contents. Block 102 represents the workflow that the identification process on the server side, which identifies the VDNA fingerprints, sent from front-end devices.

Step of 101-1 is a media content source that is going to be identified. The front-end device captures the source content using its sensors as illustrated 101-2 but it is not just limited in this form, the content can also by played on the device that used for capturing so that the content can be retrieved by the device directly from its memory. Then the captured content is extracted to VDNA fingerprints by dedicated routines as illustrated 101-3. The routine can also be programmed into hardware chips, which has the same capturing and extraction abilities. The process of extracting VDNA fingerprints is similar to collecting and recording human fingerprints. One of the remarkable advantages of VDNA technology is to rapidly and accurately identify media contents. The VDNA fingerprints are also compact for transmission and cannot revert to the original media content that helps to protect privacy. Processed VDNA fingerprint data are then sent to identification server together with the captured timestamp via network as illustrated 101-4. The fingerprint data can be stored independently when the network to identification server is not available, and sent to identification server whenever the network transmission to identification server is available.

The identification server keeps accepting identification requests from front-end devices. Once it receives the VDNA fingerprint data (102-1), it starts identification process to identify the VDNA fingerprint data as illustrated 102-3. The identification server will wait until the fingerprint data is enough to identify. While the network speed is unknown, the identification will restore the fingerprint data to the original type that provided by the front-end device.

VDNA fingerprint data are compared with master VDNA fingerprints that registered in the fingerprint database (102-2) using optimized comparing algorithm. The identification result will be combined with the capturing timestamps with earlier identification history to achieve more accurate results. The identification server responses feedback to the front-end device, where predefined actions will be taken as illustrated 102-4.

Using sensors on the front-end mobile device to capture media content is not the only one method to retrieve media content for recognition. There are also other methods, for example, the media content file such as MP3 files and AVI files can be used as media content source for extracting VDNA fingerprints.

All types of media content sources, either it is captured via sensors from front-end devices or raw media content files or media content streaming etc., can be treated as color information on the display screens, so that they can be converted into similar representations which can be processed by the VDNA fingerprint data extracting program.

The modern media recognition technologies such as VDNA fingerprints allow to identify the media contents that are not exactly the same as the sample master media content. Small changes like watermarks, station logos, borders and banners etc. are allowed and have only little influence in identification process. Such characteristic of recognition technologies allows the media content captured from analogy sources or cameras that is independent of the displays where the media content is on, and allows other noise information while capturing. The effect of automatic content recognition by machines can be as accurate as the identification result from human resources, only with lower costs and more rapid.

Figure 2:
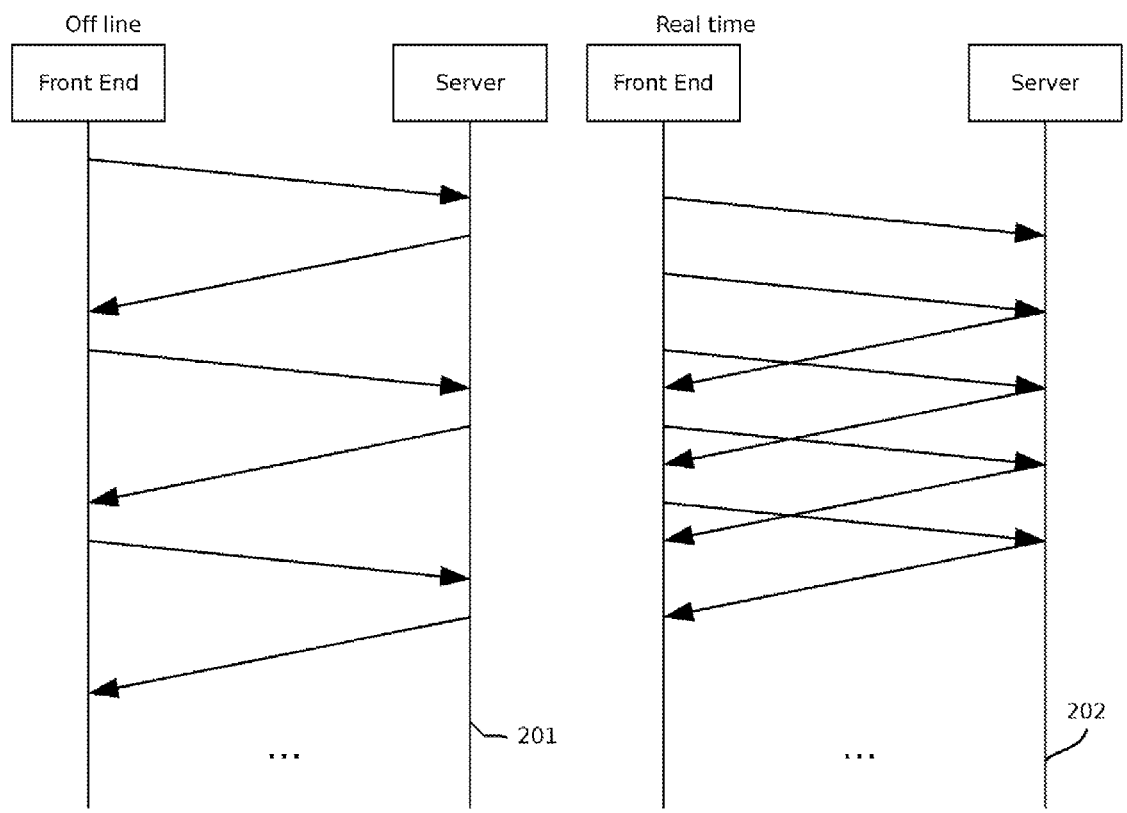
FIG. 2 is a flow chart showing timelines of two different ways of automatic content recognition including the offline mode and real time mode.

FIG. 2 illustrates timelines of the two identification methods. The identification process in the server is triggered by each request from the front-end device, which is defined as offline mode as illustrated 201. FIG. 202 represents the real time mode that the server will combine the identification result with earlier identified results. In the offline mode, the front-end device may have no network connection to the server, then it can store the VDNA fingerprint data with timestamps in its storage. The VDNA fingerprints are sent to server at the time when connection to server is available. Identification server processes each request from the front-end device.

In real time mode, front-end devices must be online, so that it can send VDNA fingerprint data as soon as extracted. In the real time mode identification server processes the requests all the time to make identification results more accurate.

The term "identification server" can refer to a full functional server or a distributed cluster of servers in the back-end of the auto content recognition system. It can be deployed as one server for a small scope of users or scaled up to a cluster of servers when serving a huge amount of users.

The identification server not only works as the server end for the front-end devices which send identification requests, but also collects basic identification information for content owners.

Content owners can use the identification results to analysis the distribution of the media content all over the world. Real time mode recognition can be used for content owners to predict what is going to play on the front-end devices. For instance, content owners can predict the advertisement time when the front-end user is watching the recorded media content that provided by the content owner. Content owners can change the recorded advertisements on the recorded media content. They can also help people remember their works anytime they encounter the media contents.

Figure 3:
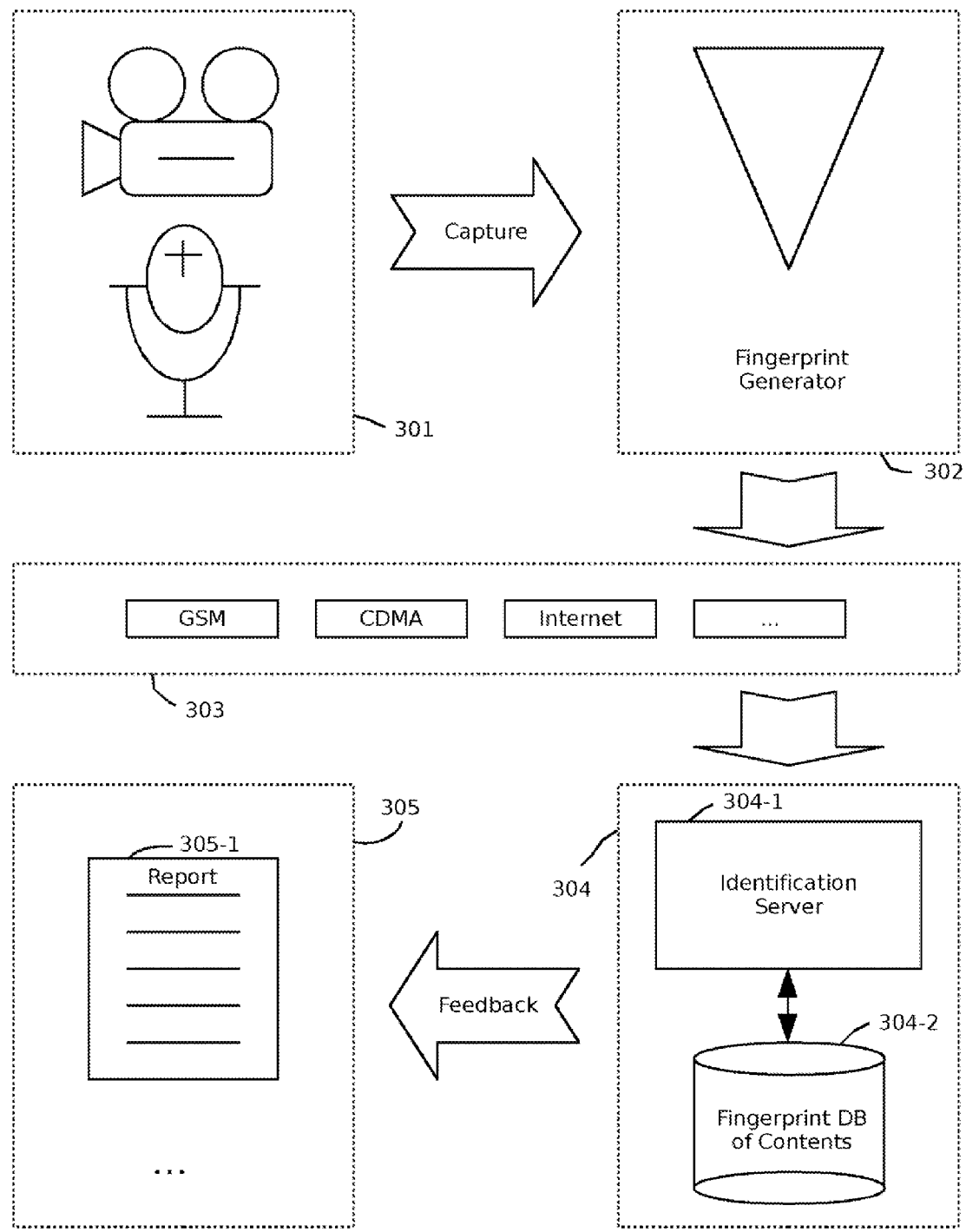
FIG. 3 shows schematically a component diagram of every main functional entity in the ACR system according to the present invention.

FIG. 3 illustrates main functional components of the automatic content recognition system, in which 301 and 302 are components on the front-end devices, 304 and 305 represent the identification server end. FIG. 303 represents the network that connects the front-end device with identification server.

Front-end devices capture media content using their sensors as illustrated 301. Sensors of the front-end device can be used for in the scenario that the front-end device captures original media content data from outside of the device. There is one exception that sensors is not needed is that the media is playing inside the front-end device so that the front-end device can retrieve the media contents from its own memory.

Sensors illustrated in 301 can be cameras, microphones and other types of sensors that help the device capturing media content.

The other component of front-end device that illustrated in block 302 is the VDNA fingerprint generator. This component is used to process raw media content that captured by sensors that illustrated in 301. Raw media content data has large size, which is not feasible to transfer over networks, especially mobile networks. The fingerprint generator extracts the raw media data irreversibly into VDNA fingerprint data using advanced algorithms. The extracted VDNA fingerprint data is very compact so that it is suitable for network transmission. Because of the non-reversible process, the VDNA fingerprint data cannot be used by others when transferring over network, which helps protecting the content not to be illegally used by others. The VDNA fingerprint data generator is a dedicated routine in the automatic content recognition framework, the parameters of the extraction process is predefined and agreed by both the front-end devices and the back-end identification server.

After the VDNA fingerprints are generated, it will be sent to the remote identification server with available networks as illustrated 303. All types of networks can be used to carry the VDNA fingerprint data. For example, in GSM (global service for mobile) network access, the VDNA fingerprint data can be sent as MMS (multimedia message service) to the identification server. Other networks will also be fine using the protocols provided by the network, such as IP packages through Internet, GPRS (general packet radio service) networks or CDMA networks etc. For front-end users, transmission method is transparent. The identification server can response to the front end user as the same method as front end device used, or any type of method can be use to communicated with front end device.

The identification server works on the other end of network as illustrated 304. It accepts identification requests, and receives VDNA fingerprint data from front-end users. The identification server is a generic term of one or many servers that working for the identification method. Server starts the identification method after receiving VDNA fingerprint data. The method may involve cooperation between servers, but the generic function is to keep a session with a front-end user in a same identification progress, and then identify the VDNA fingerprint data with registered media contents in the fingerprint database that specified by content owners. This part of the identification system includes the VDNA fingerprint database (304-2) and the identification server which is illustrated 304-1.

The identification server will response feedback as soon as the result is generated after the VDNA fingerprint data are identified as illustrated 305. The feedback information is customizable according to content owners. For example, content owner may get reports of the content that provided by them. In the report, content owner can retrieve information about the popularity of their media contents in society. Any other form of feedback will be OK.

The identification server may response feedback of the media content information or just feedback of the basic metadata information that can be used to identify the media content. The front-end device as well as all other related components can retrieve the detail information from the information database using the basic information.

Front-end user may get information of the contents that captured by their mobile device with feedback. They may get different advertisements while playing same recorded media content by them using the feedback function as content owner wished based on their business rules.

Figure 4:
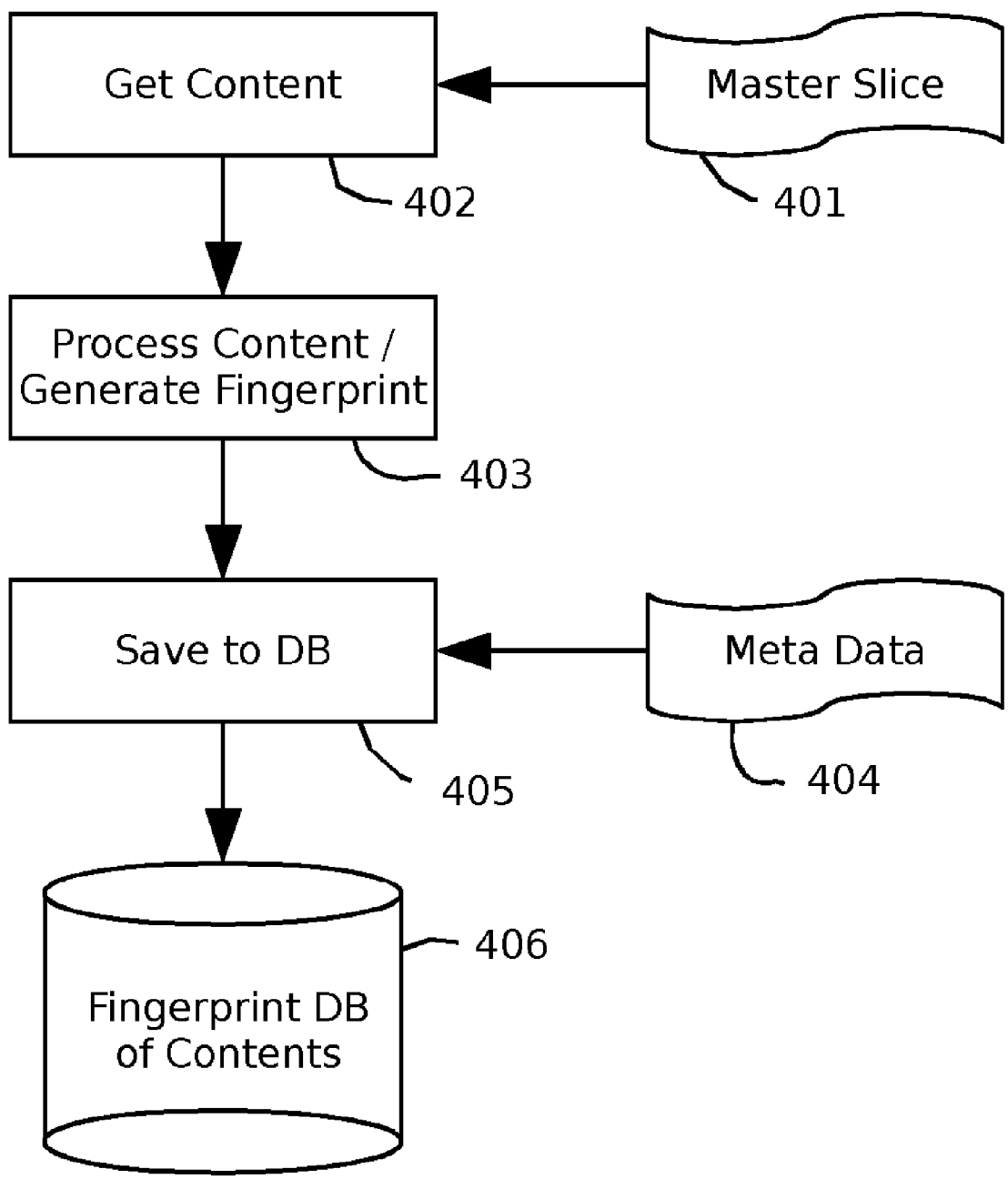
FIG. 4 is a flow chart showing a number of steps of generating VDNA fingerprints in the database that used by identification server.

FIG. 4 illustrates the workflow of the method that generating the fingerprint database. The fingerprint database is built by content owners or people who has authorities to access genuine media contents. The database can be one database or a cluster of databases which function together to store VDNA fingerprint entries. Sample VDNA fingerprint data are extracted from the original media content (401) as illustrated 402 and 403. Then the fingerprint data is inserted into fingerprint database combined with metadata of the master media. The VDNA fingerprint data generation method should be the same as the method that used on front-end device to process raw captured media content. People who have enough privileges to access the database can modify metadata any time required. But the fingerprint data will not be changed after extracted using a predefined generation method.

The parameters of the method that extracts VDNA fingerprint data on the database end determines the recognition technology that the automatic content recognition system (including both the front-end extraction routine and the back-end identification process) applies.

The VDNA fingerprint data stored in the fingerprint database is not the only criteria that used for media content identification. Other information like hash of the media content, keywords and other metadata information can also be used as elements to identify media contents. The identification server can filter subsets of fingerprint data from the whole fingerprint database using hash, keywords and so on. It consumes less resource to compare with a subset of VDNA fingerprint data then comparing with every entry in the fingerprint database while recognizing.

To further understand the details of the present invention, the definitions of some processing are necessary which are as follows:

Extract/Generate: to obtain and collect characteristics or fingerprints of media contents via several extraction algorithms.

Register/Ingest: to register those extracted fingerprints together with extra information of the media content into the database where fingerprints of master media contents are stored and indexed.

Query/Match/Identify: to identify requested fingerprints of media content by matching from all registered fingerprints of master contents stored in the database, via advanced and optimized fingerprint matching algorithm.

In summary, system and method for auto content recognition of the present invention comprise:

A method of auto content recognition comprises the following steps:
  a) Capturing contents with audio and video sensors,
  b) Processing the aforementioned captured contents by extracting fingerprints so that they are feasible and secure to transfer over Internet,
  c) Sending the aforementioned extracted fingerprints to content identification server, and
  d) The aforementioned content identification server replying with information of identified contents after identifying the aforementioned fingerprint with its registered contents.

The aforementioned captured contents can be eye sensible contents such as video and image that can be captured by camera, ear sensible contents that can be captured by recorder, or other information such as text that can be captured by sensors.

The aforementioned processing comprises generating fingerprints which are feasible and secure to transfer over communication facilities, and the aforementioned fingerprints can be split into small pieces for transmission purpose and can also join together to restore the aforementioned original fingerprints.

The aforementioned processing of original content generates the aforementioned transmissible fingerprints.

The aforementioned fingerprints are used to identify contents, and the aforementioned fingerprints are non-recoverable after generation to protect privacy.

The aforementioned fingerprints can also be an URI (Uniform Resource Identifier) to globally and uniquely identify the aforementioned content on an identification server.

The aforementioned sending to the aforementioned server can be through Internet by TCP/IP (Transmission Control Protocol and Internet Protocol), through mobile communications such as the GSM (Global Service of Mobile communication) or CDMA (Code Division Multiplex Access) networks, and all other networks.

The aforementioned fingerprints can be sent as soon as the aforementioned content is captured, which is defined as online mode; or saved in a terminal and sent later when network is available, which is defined as offline mode.

The aforementioned information replying from the aforementioned server can comprise business rules such as pre-formatted text and script used to help people recognize the aforementioned content easily, or contents related to the aforementioned captured content used to help people record the aforementioned content.

The result of the aforementioned identification can be used to learn more about the source of recognized media.

The time between the aforementioned fingerprints in the aforementioned identifying process sent to the aforementioned server is one of the factors affecting the result.

A system of auto content recognition comprises the following sub-systems:
  a) components of front-end sub-system with capturing function and user interface,
  b) transmission sub-system with fingerprint process function on the aforementioned front-end,
  c) communication sub-system transferring data between the aforementioned front-end and identification server together with identifying function on the aforementioned server,
  d) identification sub-system with the aforementioned identifying function, and
  e) a back-end database of registered contents.

The aforementioned front-end can be an application program or API (application program interface) on devices playing contents.

The aforementioned front-end can be application or API (application program interface) on devices that have sensors which can capture content from outside the aforementioned device.

The aforementioned fingerprint processor on the aforementioned front-end is used to make content transmitted through the aforementioned communication sub-system, and fingerprint produced by the aforementioned fingerprint processor will be the aforementioned content itself or data used to identify the aforementioned content.

The aforementioned identifying function can work on real-time returning results during the aforementioned identification progress as well as at the end of the aforementioned identification progress.

The aforementioned identifying function utilizes context sent to the aforementioned server earlier to improve the aforementioned identification results.

A method of database generation for auto content recognition comprises the following steps:

a) Registering media provided by content owners as master contents,
  b) Generating fingerprint data of the aforementioned master contents on front-end used for generating fingerprint for captured media, and
  c) Collecting metadata of registered media contents in back-end database.

The aforementioned master contents are media contents ready to be identified.

The aforementioned metadata of the aforementioned master contents can also be used to identify the aforementioned media contents.

The method and system of the present invention are based on the proprietary architecture of the aforementioned VDNA® platforms, developed by Vobile, Inc, Santa Clara, Calif. Methods and systems that detail the implementation of the VDNA technology are provided in the commonly owned U.S. Pat. Nos. 8,009,861 and 8,204,314, which are herein incorporated in their entireties.

The method and system of the present invention are not meant to be limited to the aforementioned experiment, and the subsequent specific description utilization and explanation of certain characteristics previously recited as being characteristics of this experiment are not intended to be limited to such techniques.

Many modifications and other embodiments of the present invention set forth herein will come to mind to one ordinary skilled in the art to which the present invention pertains having the benefit of the teachings presented in the foregoing descriptions. Therefore, it is to be understood that the present invention is not to be limited to the specific examples of the embodiments disclosed and that modifications, variations, changes and other embodiments are intended to be included within the scope of the appended claims. Although specific terms are employed herein, they are used in a generic and descriptive sense only and not for purposes of limitation.

What is claimed is:

1. A method of auto content recognition by VDNA (Video DNA, here DNA simply stands for identifier) fingerprints of media content for both video and audio contents, said method comprising:
  a) Capturing contents with audio and video sensors,
  b) Processing said captured contents by extracting VDNA fingerprints so that they are feasible and secure to transfer over Internet,
  c) Sending said extracted VDNA fingerprints to content identification server, and
  d) Said content identification server replying with information of identified contents after identifying said VDNA fingerprint with its registered contents,
wherein
  parameters of VDNA fingerprint extraction are privately predefined and agreed by both front-end devices and said identification server,
  said VDNA fingerprint is very compact for transmission from said front-end to said identification server and said VDNA fingerprint can be a single file or fingerprints data stream wherein said fingerprints data stream is divided into pieces of fingerprint data with any time interval as separate VDNA fingerprint data files, and said identification server combines the received pieces of said fingerprint data from said front-end, and
  said VDNA fingerprints are non-recoverable and non-reversible to protect privacy.

2. The method as recited in claim 1, wherein said captured contents can be eye sensible contents such as video and image that can be captured by camera, ear sensible contents that can be captured by recorder, or other information such as text that can be captured by sensors.

3. The method as recited in claim 1, wherein said processing comprises generating said VDNA fingerprints which are feasible and secure to transfer over communication facilities, and said VDNA fingerprints can be split into small pieces for transmission purpose and can also join together to restore said original VDNA fingerprints.

4. The method as recited in claim 3, wherein said processing of original content generates said transmissible VDNA fingerprints.

5. The method as recited in claim 3, wherein said VDNA fingerprints are used to identify contents, and said VDNA fingerprints are non-recoverable after generation to protect privacy.

6. The method as recited in claim 5, wherein said VDNA fingerprints can also be an URI (Uniform Resource Identifier) to globally and uniquely identify said content on an identification server.

7. The method as recited in claim 1, wherein said sending to said server can be through Internet by TCP/IP (Transmission Control Protocol and Internet Protocol), through mobile communications such as GSM (Global Service of Mobile communication) or CDMA (Code Division Multiplex Access) networks, and other networks.

8. The method as recited in claim 1, wherein said VDNA fingerprints can be sent as soon as said content is captured, which is defined as online mode, or saved in a terminal and sent later when network is available, which is defined as offline mode.

9. The method as recited in claim 1, wherein said information replying from said server can comprise business rules such as pre-formatted text and script used to help people recognize said content easily, or contents related to said captured content used to help people record said content.

10. The method as recited in claim 1, wherein result of said identification can be used to learn more about source of recognized media.

11. The method as recited in claim 1, wherein time between said VDNA fingerprints in said identifying process sent to said server is one of factors affecting result.

12. A system of auto content recognition by VDNA (Video DNA, here DNA simply stands for identifier) fingerprints of media content for both video and audio contents, said system comprising:
a) components of front-end sub-system with capturing function and user interface,
b) transmission sub-system with VDNA fingerprint process function on said front-end,
c) communication sub-system transferring data between said front-end and identification server together with identifying function on said server,
d) identification sub-system with said identifying function, and
e) a back-end database of registered contents,
wherein
parameters of VDNA fingerprint extraction are privately predefined and agreed by both front-end devices and said identification server,
said VDNA fingerprint is very compact for transmission from said front-end to said identification server and said VDNA fingerprint can be a single file or fingerprints data stream wherein said fingerprints data stream is divided into pieces of fingerprint data with any time interval as separate VDNA fingerprint data files, and said identification server combines the received pieces of said fingerprint data from said front-end, and
said VDNA fingerprints are non-recoverable and non-reversible to protect privacy.

13. The system as recited in claim 12, wherein said front-end can be an application program or API (application program interface) on devices playing contents.

14. The system as recited in claim 12, wherein said front-end can be application or API (application program interface) on devices that have sensors which can capture content from outside said device.

15. The system as recited in claim 12, wherein said VDNA fingerprint processor on said front-end is used to make content transmitted through said communication sub-system, and said VDNA fingerprint produced by said VDNA fingerprint processor will be said content itself or data used to identify said content.

16. The system as recited in claim 12, wherein said identifying function can work on real-time returning results during said identification progress as well as at the end of said identification progress.

17. The system as recited in claim 12, wherein said identifying function utilizes context sent to said server earlier to improve said identification results.

18. A method of database generation for auto content recognition by VDNA (Video DNA, here DNA simply stands for identifier) fingerprints of media content for both video and audio contents, said method comprising:
a) Registering media provided by content owners as master contents,
b) Generating VDNA fingerprint data of said master contents on front-end used for generating VDNA fingerprint for captured media, and
c) Collecting metadata of registered media contents in back-end database,
wherein
parameters of VDNA fingerprint extraction are privately predefined and agreed by both front-end devices and said identification server,
said VDNA fingerprint is very compact for transmission from said front-end to said identification server and said VDNA fingerprint can be a single file or fingerprints data stream wherein said fingerprints data stream is divided into pieces of fingerprint data with any time interval as separate VDNA fingerprint data files, and said identification server combines the received pieces of said fingerprint data from said front-end, and
said VDNA fingerprints are non-recoverable and non-reversible to protect privacy.

19. The method as recited in claim 18, wherein said master contents are media contents ready to be identified.

20. The method as recited in claim 18, wherein said metadata of said master contents can also be used to identify said media contents.

* * * * *